US012645377B2

(12) United States Patent
Mizukane

(10) Patent No.: US 12,645,377 B2
(45) Date of Patent: Jun. 2, 2026

(54) APPARATUSES AND METHODS FOR REFRESH MANAGEMENT ENTRY TIMING

(71) Applicant: MICRON TECHNOLOGY, INC., Boise, ID (US)

(72) Inventor: Yoshio Mizukane, Sagamihara (JP)

(73) Assignee: Micron Technology, Inc., Boise, ID (US)

( * ) Notice: Subject to any disclaimer, the term of this patent is extended or adjusted under 35 U.S.C. 154(b) by 17 days.

(21) Appl. No.: 18/743,869

(22) Filed: Jun. 14, 2024

(65) Prior Publication Data

US 2025/0103226 A1 Mar. 27, 2025

Related U.S. Application Data

(60) Provisional application No. 63/584,541, filed on Sep. 22, 2023, provisional application No. 63/584,668, filed on Sep. 22, 2023.

(51) Int. Cl.
*G06F 3/06* (2006.01)

(52) U.S. Cl.
CPC .......... *G06F 3/0632* (2013.01); *G06F 3/0604* (2013.01); *G06F 3/0673* (2013.01)

(58) Field of Classification Search
CPC ..... G06F 3/0632; G06F 3/0604; G06F 3/0673
See application file for complete search history.

(56) References Cited

U.S. PATENT DOCUMENTS

| | | | | |
|---|---|---|---|---|
| 2022/0091784 A1* | 3/2022 | Brandl | .............. | G11C 11/40611 |
| 2023/0317136 A1* | 10/2023 | Woo | .................. | G11C 11/40622 |
| | | | | 365/222 |
| 2023/0326511 A1* | 10/2023 | Oh | ...................... | G11C 11/4063 |
| | | | | 365/222 |
| 2024/0028221 A1* | 1/2024 | Lee | ........................ | G06F 3/0623 |
| 2024/0038288 A1* | 2/2024 | Kim | ........................ | G11C 7/24 |
| 2024/0104209 A1* | 3/2024 | Hwang | ................. | G06F 21/554 |
| 2024/0202328 A1* | 6/2024 | Jung | ........................ | G06F 21/79 |
| 2024/0355375 A1* | 10/2024 | Joo | .................. | G11C 11/40611 |
| 2024/0386934 A1* | 11/2024 | Hamo | ................. | G11C 11/4096 |
| 2024/0428840 A1* | 12/2024 | Song | ................. | G11C 11/40615 |
| 2025/0085875 A1* | 3/2025 | Litt | ....................... | G06F 3/0604 |

* cited by examiner

*Primary Examiner* — Edward J Dudek, Jr.
(74) *Attorney, Agent, or Firm* — Dorsey & Whitney LLP

(57) ABSTRACT

Memory devices receive refresh management (RFM) commands and perform a targeted refresh operation responsive to the RFM command. Certain conflicts may occur if the RFM command is received while the memory is performing certain operations. An RFM entry circuit receives the RFM command at a first time and then provides an internal RFM signal at a second time. The second time may be the next time a row activation or refresh is performed after receiving the RFM command. The targeted refresh operation is performed responsive to the internal RFM signal.

20 Claims, 5 Drawing Sheets

500

510
Receiving a Refresh Management Command at a First Time

520
Activating or Refreshing a Word Line at a Second Time After the First Time

530
Providing an Internal Refresh Management Signal Responsive to the Refresh Management Command at the Second Time 540
Performing a Targeted Refresh Operation Responsive to the Internal Refresh Management Signal

APPARATUSES AND METHODS FOR REFRESH MANAGEMENT ENTRY TIMING

CROSS REFERENCE TO RELATED APPLICATION(S)

This application claims the benefit under 35 U.S.C. § 119 of the earlier filing date of U.S. Provisional Application Ser. No. 63/584,541 filed Sep. 22, 2023 and U.S. Provisional Application Ser. No. 63/584,668 filed Sep. 22, 2023, the entire contents of which are hereby incorporated by reference in their entirety for any purpose.

BACKGROUND

Information may be stored on memory cells of a memory device. The memory cells may be organized at the intersection of word lines (rows) and bit lines (columns). Information in the memory cells may decay over time. For example, the information may be stored as a charge on a capacitor which may decay over time. The memory device may perform refresh operations to restore the information and prevent information from being lost.

Certain patterns of access may cause an increased rate of information decay in nearby memory cells (e.g., the memory cells along nearby word lines). Memories may use various schemes to identify which memory cells are affected by such patterns such that targeted refresh operations can be performed before those memory cells lose their information. There is need to balance the targeted refresh operations with the time and power they use.

DETAILED DESCRIPTION

Figure 1:
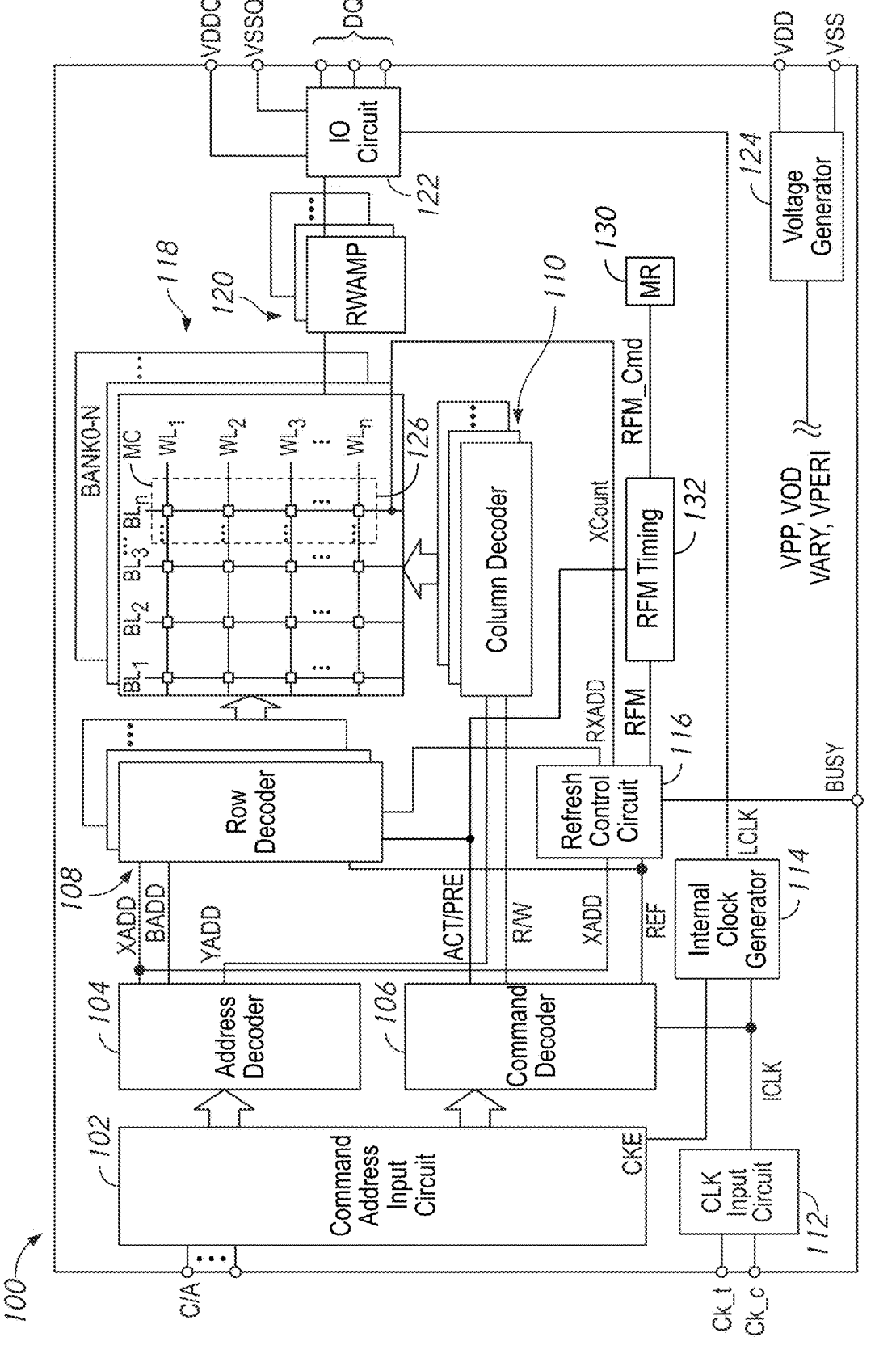
FIG. 1 is a block diagram of a semiconductor device according to an embodiment of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Information in a memory array may be accessed by one or more access operations, such as read or write operations. During an example access operation, a word line may be activated based on a row address and then selected memory cells along that active word line may have their information read or written to based on which bit lines are accessed, which may be based on a column address. The memory array may be refreshed on a row by row basis (e.g., as part of an auto-refresh and/or self-refresh mode) where the memory cells along each row are refreshed periodically. The speed at which the rows are refreshed (e.g., the maximum time any given row will go between refreshes) may be determined based on an expected rate of information decay.

Various patterns of access to a row (an aggressor row) may cause an increased rate of information decay in nearby memory cells (e.g., along victim rows). For example, a 'row hammer' may involve repeated accesses to the aggressor row which may increase a rate of decay in adjacent rows (and/or in rows which are further away). Accordingly, it may be important to track a number of accesses to each row to determine if they are aggressors, such that the victim rows can be identified and refreshed as part of a targeted refresh operation. For example, each word line may have an associated count value which is used to determine how many times that word line has been accessed. Based on those access counts, rows may be identified for targeted refresh operations. The identified aggressors may be stored in a refresh queue.

The memory may determine when to perform targeted refresh operations based on internal logic. In addition to the internal logic, (or instead) a controller may issue a refresh management (RFM) command. Responsive to the RFM command the memory may perform one or more targeted refresh operations. It may take time for the memory to add the identified aggressor address to the refresh queue. There may be circumstances where the RFM command is received while the address is still being added to the queue, which may cause conflicts or improper refresh operations. The timing may be especially important in an adaptive RFM (ARFM), a mode which allows the customer to set various refresh options, and which may cause an increased size (e.g., an increased depth or greater number of possible stored addresses) of the refresh queue to be used. There may be a need to ensure adequate timing between receiving a refresh management command and any action which effects the tracking of aggressor addresses.

The present disclosure is drawn to apparatuses, systems, and methods for refresh management entry timing. A memory device includes an RFM entry circuit which receives an RFM command from a controller. The RFM entry circuit provides an internal RFM signal, and responsive to that internal RFM signal, one or more targeted refresh operations are performed. After receiving the RFM command, the RFM entry circuit provides the internal RFM signal responsive to a next row activation or refresh operation in the memory. This may help prevent a situation where the RFM command is received while the memory is still adjusting the targeted refresh queue based on a previous access or refresh operation. By waiting until the next row activation or refresh operation, the RFM command will be processed (e.g., the internal RFM signal will be issued) when there are no conflicts.

In an example embodiment, the controller may provide the RFM command by changing a state of an RFM register in a mode register (e.g., via a mode register write operation). The value of the RFM register is read out to the RFM timing circuit as the RFM command. When the RFM timing circuit also receives a signal, which indicates a row access or refresh operation, the value of the register (e.g., the RFM command) is passed as the RFM signal to the refresh control circuit, which performs a targeted refresh operation. The memory then resets the value of the RFM register based on the RFM signal being issued. The controller may only be able to issue mode register write commands when the memory is in an idle state (e.g., all banks are idle). The next activation or refresh command represents a next time the bank is active. If the RFM command is an ARFM command, this may allow the depth of the aggressor queue to be changed while the affected bank is inactive (e.g., idle).

FIG. 1 is a block diagram of a semiconductor device according to at least one embodiment of the disclosure. The semiconductor device 100 may be a semiconductor memory device, such as a DRAM device integrated on a single semiconductor chip.

The semiconductor device 100 includes a memory array 118. The memory array 118 is shown as including a plurality of memory banks. In the embodiment of FIG. 1, the memory array 118 is shown as including eight memory banks BANK0-BANK7. More or fewer banks may be included in the memory array 118 of other embodiments. Each memory bank includes a plurality of word lines WL (rows), a plurality of bit lines BL (columns), and a plurality of memory cells MC arranged at intersections of the plurality of word lines WL and the plurality of bit lines BL.

The selection of the word line WL is performed by a row decoder 108 and the selection of the bit lines BL is performed by a column decoder 110. In the embodiment of FIG. 1, the row decoder 108 includes a respective row decoder for each memory bank and the column decoder 110 includes a respective column decoder for each memory bank. The bit lines BL are coupled to a respective sense amplifier (SAMP). Read data from the bit line BL is amplified by the sense amplifier SAMP, and transferred to read/write amplifiers 120 over complementary local data lines (LIOT/B), transfer gate (TG), and complementary main data lines (MIOT/B). Conversely, write data outputted from the read/write amplifiers 120 is transferred to the sense amplifier SAMP over the complementary main data lines MIOT/B, the transfer gate TG, and the complementary local data lines LIOT/B, and written in the memory cell MC coupled to the bit line BL.

The semiconductor device 100 may employ a plurality of external terminals that include command and address (C/A) terminals coupled to a command and address bus to receive commands and addresses, and a CS signal, clock terminals to receive clocks CK and/CK, data terminals DQ to provide data, and power supply terminals to receive power supply potentials VDD, VSS, VDDQ, and VSSQ.

The clock terminals are supplied with external clocks CK and/CK that are provided to an input circuit 112. The external clocks may be complementary. The input circuit 112 generates an internal clock ICLK based on the CK and/CK clocks. The ICLK clock is provided to the command decoder 110 and to an internal clock generator 114. The internal clock generator 114 provides various internal clocks LCLK based on the ICLK clock. The LCLK clocks may be used for timing operation of various internal circuits. The internal data clocks LCLK are provided to the input/output circuit 122 to time operation of circuits included in the input/output circuit 122, for example, to data receivers to time the receipt of write data.

The C/A terminals may be supplied with memory addresses. The memory addresses supplied to the C/A terminals are transferred, via a command/address input circuit 102, to an address decoder 104. The address decoder 104 receives the address and supplies a decoded row address XADD to the row decoder 108 and supplies a decoded column address YADD to the column decoder 110. The address decoder 104 may also supply a decoded bank address BADD, which may indicate the bank of the memory array 118 containing the decoded row address XADD and column address YADD. The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 106 via the command/address input circuit 102. The command decoder 106 includes circuits to decode the internal command signals to generate various internal signals and commands for performing operations. For example, the command decoder 106 may provide a row command signal to select a word line and a column command signal to select a bit line.

The device 100 may receive an access command which is a read command. Responsive to the read command, data is read out from the memory array 118 to the data terminals DQ. The data is read out from memory cells in a bank specified by BADD at the intersection of a word line specified by XADD and bit line(s) specified by YADD. The read command is received by the command decoder 106, which provides internal commands such as a row activation signal ACT and a read signal R. Responsive to ACT and the row address XADD, the row decoder 108 activates the specified word line and responsive to R and the column address Y the column decoder 110 couples the sense amplifiers coupled to the specified bit lines to the read/write amplifier 120, to read out the values along those bit lines from the memory cells at the intersection with the active word line as read data to the IO circuit 122. The read data is output to outside from the data terminals DQ via the input/output circuit 122.

The device 100 may receive an access command which is a write command. Responsive to the write command, data received along the DQ terminals is written to the memory array 118. The data is written to the memory cells in a bank specified by BADD at the intersection of a word line specified by XADD and bit line(s) specified by YADD. The write command is received by the command decoder 106 which provides internal commands such as ACT and a write signal W. The IO circuit 122 receives data which is provided to the read/write amplifiers 120. Responsive to ACT, the row decoder activates a word line specified by XADD, and responsive to W, the column decoder 110 couples the write data from the read/write amplifiers 120 to the bit lines specified by YADD, where the sense amplifiers amplify the write data so that it is written to the memory cells at the intersection with the active word line.

The device 100 may also receive commands causing it to carry out refresh operations. For example, a controller of the memory may put the device 100 into an auto-refresh mode and provide refresh signal REF. The device 100 may also enter a self-refresh mode where the refresh signal is generated internally. The controller may also provide a refresh management (RFM) command or an adaptive refresh management (ARFM) command, which causes the memory 100 to perform a targeted refresh operation, as described in more detail herein.

The refresh signal REF is supplied to the refresh address control circuit 116. The refresh address control circuit 116 supplies a refresh row address RXADD to the row decoder 108, which refreshes memory cells along a word line WL identified by the refresh row address RXADD. The refresh control circuit 116 may perform sequential refresh operations, where the refresh address RXADD is generated based on sequential logic of the refresh control circuit 116, or may perform a targeted refresh operation, wherein the refresh address RXADD is based on an identified aggressor address stored in an aggressor queue of the refresh control circuit 116.

During a sequential or normal refresh operation, the refresh control circuit 116 may use sequence logic to determine the next RXADD. For example, RXADD may be based on a previous value of RXADD (e.g., RXADD(i+1) =RXADD(i)+1). A counter circuit may be used to generate the sequential refresh addresses. During a targeted refresh operation, the refresh control circuit 116 may generate RXADD based on previously identified aggressor addresses. For example, the refresh address may represent the word lines which are physically adjacent to the word line associated with the aggressor address. In some embodiments, a sequential refresh address may be associated with more word lines than a targeted refresh address.

A refresh management timing circuit 132 receives a refresh management command RFM_Cmd from the controller and provides an internal RFM signal. The refresh management circuit 132 may receive the RFM_Cmd at a first time and provide the RFM signal at a second time after the first time. The refresh management timing circuit 132 may receive RFM_Cmd and provide the refresh management signal RFM a next time that it receives a refresh signal REF or activation command ACT from the command decoder 106.

In the embodiment of FIG. 1, the refresh command RFM_Cmd is received via a mode register 130. The mode register 130 includes a number of registers which are used to control various options of the memory 100 and/or report various conditions of the memory 100. To send the RFM command, the controller may perform a mode register write operation to change state of an RFM register. The state of the RFM register may be read out of the mode register 130 as the RFM_Cmd. In some embodiments, the controller may also issue an ARFM command. The mode register 130 includes one or more registers 130 which store various pre-programmed options for targeted refresh operations. The ARFM command may specify which of these sets of options should be used. For example, the ARFM may change a depth of an aggressor queue, or a number of slots which the aggressor queue has active to store addresses. Since the RFM and ARFM operations may be generally similar except for these selectable options, the RFM command and signal will generally be used to refer to either operation.

When the refresh control circuit 116 receives the refresh signal REF, it may perform a set of refresh operations, and may determine whether those refresh operations are sequential or targeted refresh operations based on internal logic. For example, responsive to REF, the refresh control circuit may perform a set of refresh operations, and every N sequential refresh operations, one or more targeted refresh operations may be performed. When the refresh control circuit 116 receives the RFM signal from the RFM timing circuit 132, it performs one or more targeted refresh operations.

The refresh control circuit 116 identifies aggressor addresses using one or more criteria. For example, a pattern of accesses to the different addresses may be used. In the example of FIG. 1, an aggressor detection scheme is shown which uses per-row access counts or per-row hammer tracking (PRHT). However, other schemes for detecting aggressor addresses may be used in other example embodiments.

In the example of FIG. 1, each word line includes a number of counter memory cells 126, which store a count value XCount associated with that word line. The count value XCount may represent a number of times that the word line has been accessed. When a row is accessed, (e.g., by ACT and XADD) the count value XCount is read out and updated (e.g., by being incremented). If the updated count value has crossed a threshold, the row address XADD is judged to be an aggressor and is added the aggressor queue. When the address is added to the queue, the count value in the counter memory cells 126 may be reset. If the count has not crossed the threshold, the updated count value is written back to the counter memory cells 126.

The power supply terminals are supplied with power supply potentials VDD and VSS. The power supply potentials VDD and VSS are supplied to an internal voltage generator circuit 124. The internal voltage generator circuit 124 generates various internal potentials VPP, VARY, VPERI, and the like based on the power supply potentials VDD and VSS supplied to the power supply terminals. The internal potential VPP is mainly used in the row decoder 108, the internal potentials VARY are mainly used in the sense amplifiers SAMP included in the memory array 118, and the internal potential VPERI is used in many peripheral circuit blocks.

The power supply terminals are also supplied with power supply potentials VDDQ and VSSQ. The power supply potentials VDDQ and VSSQ are supplied to the input/output circuit 122. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 2:
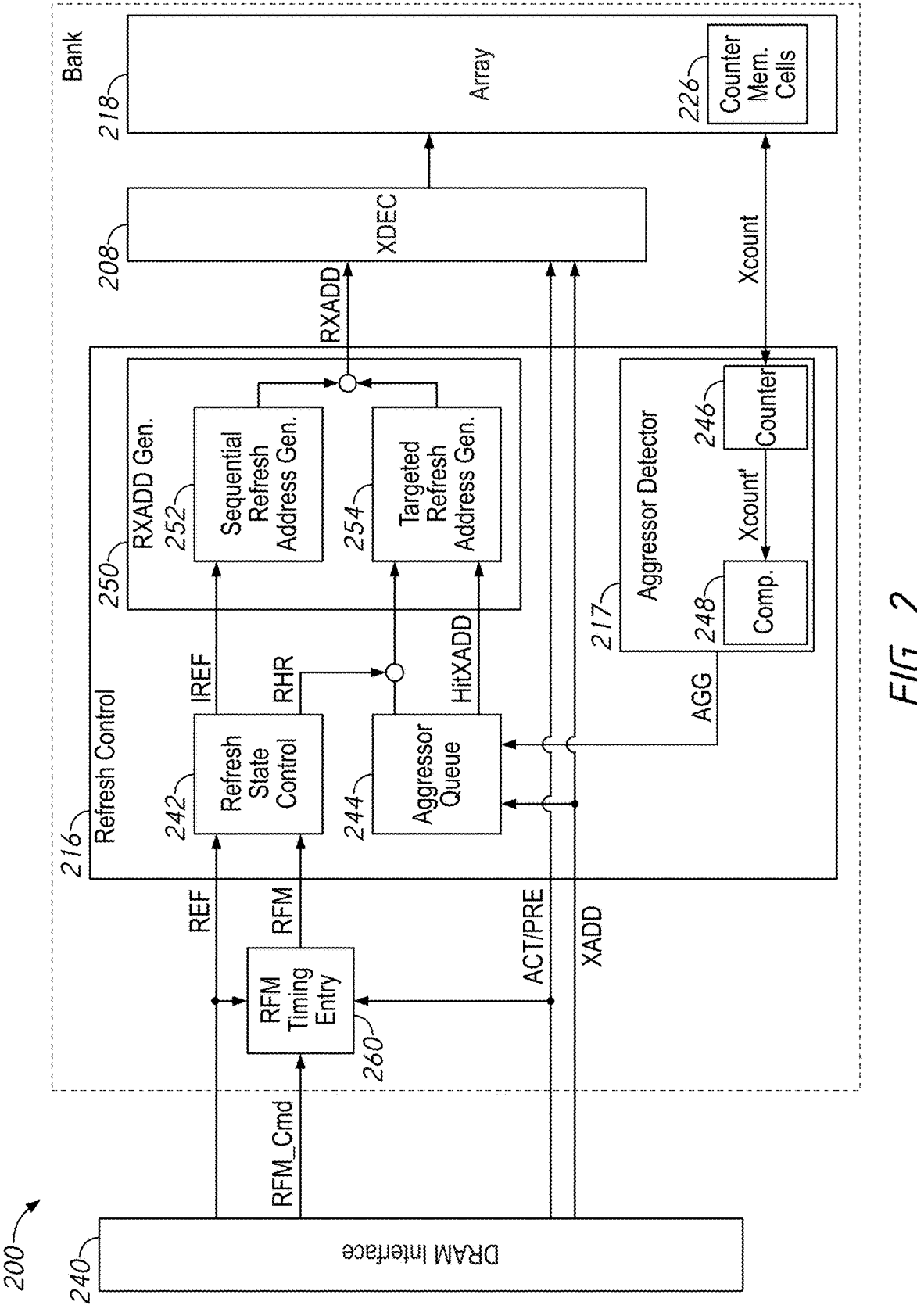
FIG. 2 is a block diagram of a portion of a memory according to some embodiments of the present disclosure.

FIG. 2 is a block diagram of a portion of a memory according to some embodiments of the present disclosure. FIG. 2 shows an example of portions of a memory relevant to refresh operations. Certain components and signals have been omitted from the view of FIG. 2. In some embodiments, the memory 200 may, in some embodiments, implement a portion of the memory device 100 of FIG. 1.

The memory 200 of FIG. 2 shows a DRAM interface 240, which represent various components of the memory which provide signals such as the row address XADD, row activation signal ACT and refresh signal REF, as well as the RFM command RFM_Cmd. A RFM entry circuit 260 (e.g., 132) receives the RFM command and provides an RFM signal RFM a next time ACT or REF is active after receiving RFM_Cmd. A refresh control circuit 216 (e.g., 116 of FIG. 1) performs refresh operations responsive to either the refresh signal REF or the RFM signal from the RFM timing entry circuit 260. Responsive to the signals REF or RFM, the refresh control circuit 216 provides a refresh address RXADD, and the row decoder 208 (e.g., 108 of FIG. 1) performs a refresh operation on memory cells of the array 218 (e.g., 118 of FIG. 1).

The refresh control circuit 216 includes a refresh state control circuit 242 which determines whether a targeted or sequential refresh operation will be performed by issuing an internal refresh signal IREF and/or a targeted refresh signal RHR. Responsive to the refresh signals IREF/RHR, a refresh address generator circuit 250 provides the refresh address RXADD. The refresh control circuit 216 also includes an aggressor detector circuit 217 which identifies aggressor addresses and stores them in an aggressor queue 244. When the refresh state control circuit 242 signals a targeted refresh operation (e.g., by providing RHR) the refresh address generator circuit 250 uses one of the addresses in the aggressor queue 244 to generate the refresh address RXADD.

In FIG. 2 a dotted line box is used to represent components which may be repeated on a bank-by-bank basis within the memory. For example, each bank may have its own row decoder 208, refresh control circuit 216 and RFM timing entry circuit 260. Other arrangements of which components are repeated on a per-bank basis and which are shared by multiple banks may be used in other example embodiments. For example, in some embodiments, the RFM timing entry circuit may be common to multiple banks, or common to all of the banks.

The refresh state control circuit 242 controls which refresh operations and how many are performed responsive to the signals REF and/or RFM. The refresh state control circuit 242 provides an internal refresh signal IREF and a targeted refresh signal RHR. The signal IREF may indicate a sequential refresh operation, while RHR may indicate a targeted refresh operation. In some embodiments, IREF alone may indicate a sequential refresh operation, while IREF and RHR active at the same time indicate a targeted refresh operation. In some embodiments, IREF and RHR may be active separately to indicate different types of refresh operation.

Responsive to the refresh signal REF, the refresh state control circuit 242 may perform a number of refresh operations or pumps. For example, a number of activations of IREF. Responsive to REF, the refresh state control circuit 242 may perform a mix of sequential and targeted refresh operations, based on internal logic. For example, some number of N of sequential refresh operations (e.g., by providing IREF) may be performed along with some number M of targeted refresh operations (e.g., by providing RHR). Responsive to the RFM signal provided by the RFM timing entry circuit 260, the refresh state control circuit 242 provides a number of activations of RHR, to signal targeted refresh operations.

The refresh address generator circuit 250 includes a sequential refresh address generator circuit 252 which provides a sequential refresh address as RXADD responsive to IREF (or to IREF alone). The sequential refresh address generator circuit 252 generates the refresh address based on sequence logic. For example, the refresh address may be generated based on an address provided as part of a previous sequential refresh operation.

The refresh address generator circuit 250 includes a targeted refresh address generator circuit 254 which provides a targeted refresh address as RXADD responsive to RHR and an identified aggressor address HitXADD from the aggressor queue 244. The targeted refresh address generator circuit 254 generates the refresh address based on the aggressor address HitXADD. For example, the refresh address RXADD may represent a word line adjacent to the word line represented by HitXADD (e.g., RXADD=HitXADD +/−1). Other relationships between the refresh address and aggressor address may be used in other example embodiments (e.g., HitXADD +/−2, +/−3, etc.).

The refresh control circuit 216 includes an aggressor detector circuit 217 which determines if an accessed address XADD should be added to the aggressor queue 244 as an aggressor address HitXADD. Various schemes may be used to determine if the address should be added to the queue. FIG. 2 shows an example embodiment where PRHT in counter memory cells 226 (e.g., 126 of FIG. 1) is used. Other aggressor tracking schemes may be used in other example embodiments.

When a row is accessed, its count value XCount is read out from the counter memory cells 226 to the aggressor detector 217. A counter circuit 246 updates the count value, to an updated count value XCount'. In some embodiments, the counter circuit 246 may update the count value by incrementing XCount (e.g., XCount'=XCount+1). The aggressor detector circuit 217 includes a comparator circuit 248 which compares the updated count value XCount' to a threshold. If the count has not crossed the threshold (e.g., is less than the threshold) then the updated count value is written back to the counter memory cells 226. If the count has crossed the threshold (e.g., is greater than or equal to the threshold) then the aggressor detector circuit provides a signal AGG to indicate that the current row address is an aggressor. The updated count value is reset (e.g., to an initial value such as 0) and written back to the counter memory cells 226.

In some embodiments, the threshold may represent a maximum value of the binary number of the count value. The count value may cross the threshold by 'rolling over' from a maximum value to a minimum value. In such embodiments, the comparator 248 may be omitted, and the counter 246 may send the signal AGG when the count rolls over.

Responsive to the signal AGG, the aggressor queue 244 adds the current row address XADD to the queue. The aggressor queue 244 may be a register which includes a number of slots, each of which stores a row address. Each slot includes a number of latch circuits, such as content addressable memory (CAM) cells or other types of latch, which store a bit of the address stored in that slot. The number of slots in the queue may generally be referred to as a 'depth' of the aggressor queue 244.

Certain settings and embodiments may increase a depth of the register. The aggressor queue 244 may include a larger physical number of slots than are used for normal targeted refresh operations, and the extra slots may go unused during normal operations. However, different settings may allow a greater number of slots to be accessed. For example, during ARFM, when the controller chooses different targeted refresh options, the additional slots of the queue may be enabled to accommodate the different targeted refresh settings. For example, the aggressor queue 244 may normally enable a first number of slots and responsive to an ARFM command the aggressor queue 244 may enable a second number of slots which is greater than the first number.

Responsive to the signal RHR, the aggressor queue 244 provides an address as the aggressor address HitXADD to the targeted refresh address generator circuit 254. After providing the address, the address is removed from the queue (or the slot is marked as empty so it can be overwritten). The queue 244 may use various logic to determine which address is provided. For example, it may act as a FIFO queue. In some embodiments, if the queue 244 is full when the signal AGG is received, the refresh control circuit 216 may provide a signal to indicate an alert. In some embodiments, the controller may issue a sequence of RFM commands to clear the queue responsive to the queue full alert.

Responsive to the signal AGG, the aggressor queue 244 may search for an open slot (e.g., one which does not store an address or one where the address has already been provided as HitxADD) and store the current address XADD in the open slot. It may take time to search the aggressor queue 244 for an open slot, and the time may increase based on a depth of the queue 244. Since the aggressor address is identified as part of an access cycle, the aggressor address may be added to the register starting with the pre-charge command Pre which closes the word line. Since there may be a delay until the address is added to the queue, the timing of the address being added may overlap with the RFM command RFM_Cmd (especially when ARFM is used) which may cause conflicts.

In order to mitigate this, the RFM timing entry circuit 260 delays providing the signal RFM responsive to the RFM_Cmd until next row access (e.g., ACT) and/or refresh command REF. This increases the timing window to allow time to ensure the address is added to the queue 244 before the RFM signal calls for a targeted refresh operation.

In some embodiments, the ARFM command may change a depth of the aggressor queue (e.g., by activating additional registers). The aggressor queue 244 may receive the ARFM command (e.g., the RFM signal RFM) and adjust the number of active slots or registers. The aggressor queue 244 may change the depth before the associated bank 218 is activated.

Figure 3:
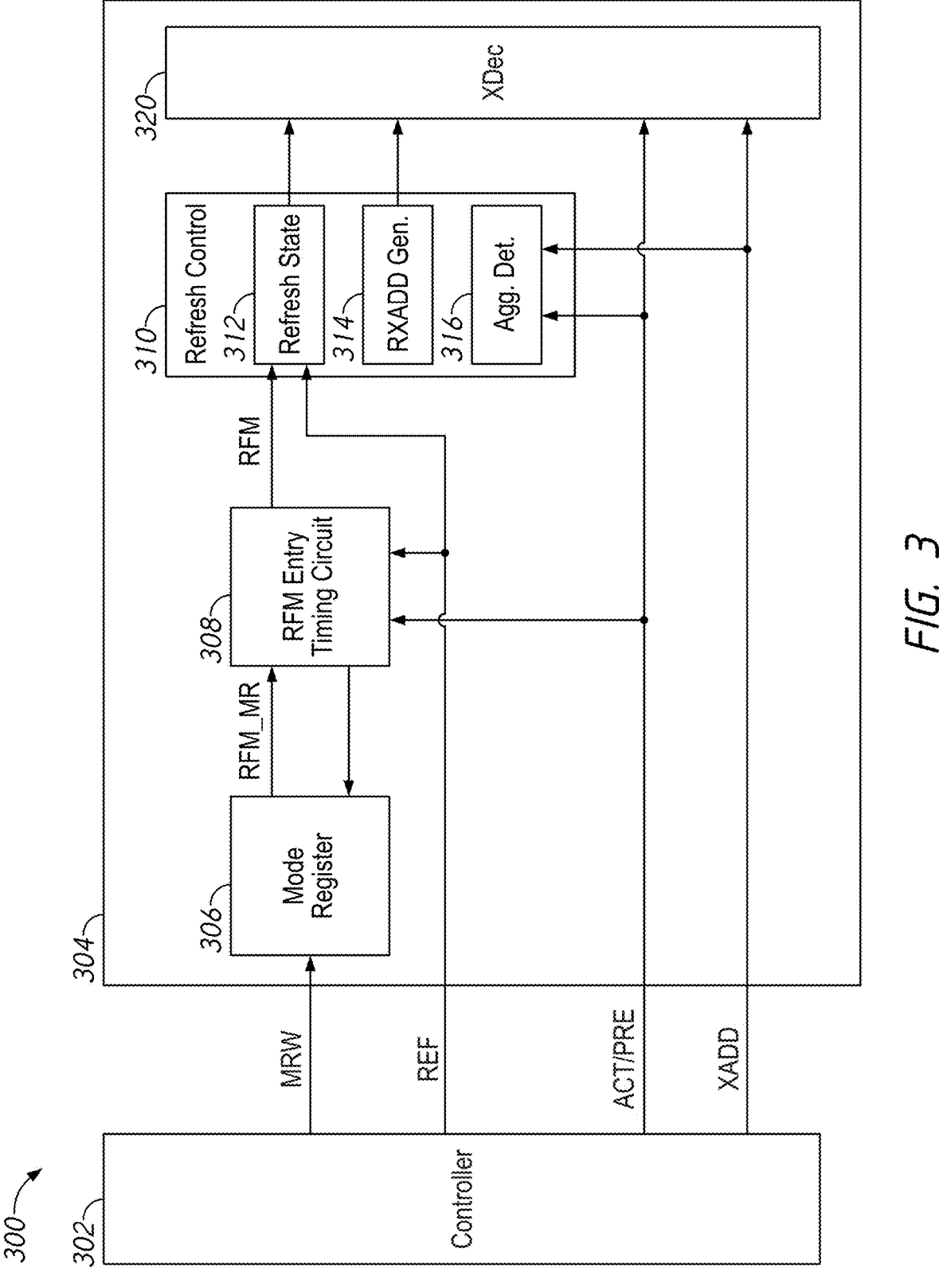
FIG. 3 is a block diagram of a memory system according to some embodiments of the present disclosure.

FIG. 3 is a block diagram of a memory system according to some embodiments of the present disclosure. The system 300 of FIG. 3 includes a controller 302 and a memory 304 operated by the controller 302. The memory 304 may, in some embodiments, include the memory 100 of FIG. 1 and/or 200 of FIG. 2. The memory 304 shows certain components relevant to RFM operations, and other components, signals, etc. may be omitted from FIG. 3.

The memory 304 includes a mode register 306 (e.g., 130 of FIG. 1), a RFM entry timing circuit 308 (e.g., 132 of FIG. 1 and/or 260 of FIG. 2), a refresh control circuit 310 (e.g., 116 of FIG. 1 and/or 216 of FIG. 2) and a row decoder 320 (e.g., 108 of FIG. 1 and/or 208 of FIG. 2). FIG. 3 shows an example embodiment where the controller 302 provides an RFM command by writing to a RFM register in a mode register 306 (e.g., 130 of FIG. 1).

The controller 302 issues an RFM command by performing a mode register write (MRW) operation on the mode register 306. The controller 302 may issues signals along a command address bus which indicate that a MRW operation should be performed, and which register should be written to. In this case, the controller 302 writes a value to an RFM mode register to set the stored value to an active level. The value in the mode register 306 is provided in the memory as a signal RFM_MR to the RFM entry timing circuit 308.

When the RFM entry timing circuit 308 receives the signal RFM_MR at an active level, it provides the internal RFM signal a next time the row activation signal ACT or the refresh signal REF is active. After providing the signal RFM, a delay time later the RFM entry timing circuit 308 resets the value of RFM_MR in the mode register 306.

The refresh control circuit 310 includes a refresh state control circuit 312 (e.g., 242 of FIG. 2) which provides refresh signals (e.g., IREF and/or RHR) to the row decoder responsive to the refresh signal REF or the RFM signal RFM from the RFM timing entry circuit 308. Along with the refresh signal, the refresh control circuit 310 also provides a refresh address RXADD from a refresh address generator circuit 314 (e.g., 250 of FIG. 2). An aggressor detector circuit 316 (e.g., 217 of FIG. 2) identifies aggressor addresses based on patterns of access to row addresses XADD. In the embodiment of FIG. 2, instead of counter memory cells, the aggressor detector may directly count times that certain addresses are accessed.

Responsive to the activation signal ACT and a row address XADD, the row decoder 320 may activate a word line of a memory array. Responsive to the refresh signals and refresh address from the refresh control circuit, the row decoder 320 may refresh one or more rows of the memory array.

Figure 4:
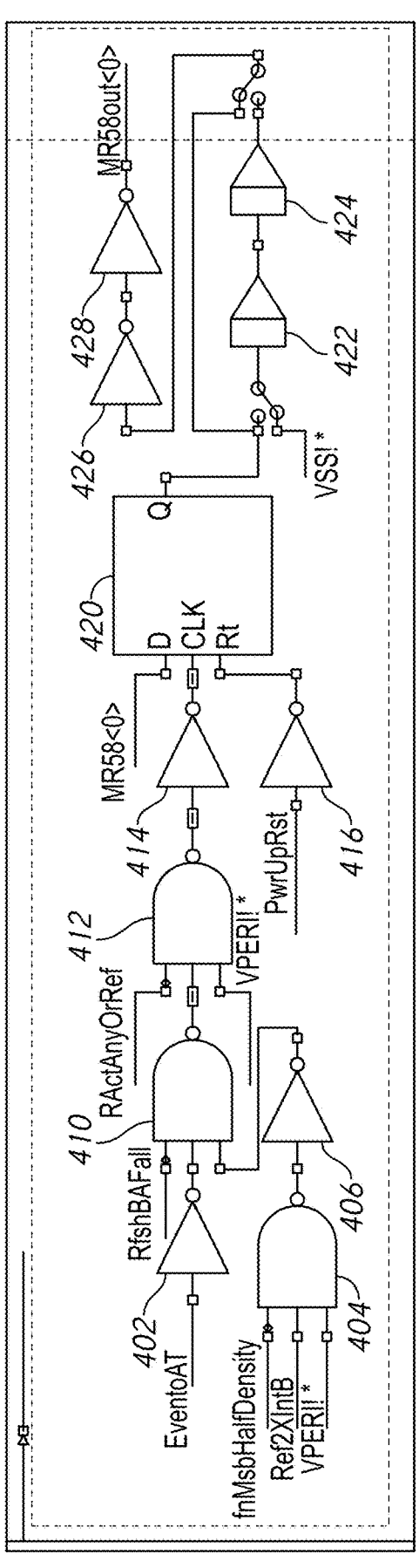
FIG. 4 is a schematic diagram of an RFM entry timing circuit according to some embodiments of the present disclosure.

FIG. 4 is a schematic diagram of an RFM entry timing circuit according to some embodiments of the present disclosure. The RFM entry timing circuit 400 may, in some embodiments, implement the RFM timing entry circuit 132 of FIG. 1, 260 of FIG. 2, and/or 306 of FIG. 3.

The RFM entry timing circuit 400 includes a latch which receives an RFM mode register signal MR58 (e.g., RFM_MR of FIG. 3) at a data terminal D of the latch. When a signal to a clock terminal CLK of the latch is active, the value of MR58 is latched and provided as a latch output terminal Q. The output is passed through buffer circuits 426 and 428 as a mode register output signal MR58out. The output signal MR58out may act as the internal RFM signal (e.g., RFM of FIGS. 1-3).

The latch 420 also includes a reset terminal Rt which is coupled through an inverter circuit 416 to a power up/reset signal PwrUpRst. Accordingly, upon power up or reset, the value in the latch 420 is reset (e.g., to an inactive state).

The output of the latch 420 is also coupled to delay circuits 422 and 424. The delay circuits are wired in parallel between an input of the serial buffer circuits 426 and 428 and a ground voltage VSS. Accordingly, when the output of the latch 420 becomes high, the value in the latch is provided as MR58out. A delay time later, where the delay time is based on the delay circuits 422 and 424, the voltage VSS, which represents an inactive state, is provided as MR58out. The output signal MR58out is also provided to the mode register, which resets the value MR58 to an inactive level based on MR58out, which in turn resets the latch circuit 420 to storing a low logical level (the next time the signal on the clock terminal CLK is active).

The RFM entry timing circuit 400 receives a signal RActAnyOrRef which is at an active level when there is a row activation of any row (e.g., based on the signal ACT) or a refresh of any row (e.g., based on the signal REF). For example, an OR gate (not shown in FIG. 4) may receive both ACT and REF as inputs and provide RActAnyOrRef as its output. A NAND gate 412 coupled serially to an inverter 414 act as an AND gate, and an output is provided to the clock terminal CLK. When the signal RActAnyOrRef is active (along with the other inputs of the NAND gate 412, as discussed in more detail herein), the clock terminal CLK receives an active signal and the value of MR58 is latched.

The RFM entry timing circuit 400 receives a number of inputs which may represent various settings of the memory and/or status of various refresh operations. These are fed through various inputs and logic gates as the other inputs of the NAND gate 412. The various additional inputs may help to ensure that the status of latch 420 is not updated during various refresh modes and operations where a targeted refresh operation responsive to RFM is not called for.

For example, NAND gate 404 and inverter circuit 406 work together as an AND gate and provide an output to one of the inputs of a NAND gate 410. The NAND gate 404 receives signals such as fnMsbHalfDensity and Ref2XIntB as well as a system voltage VPERI. The signals fnMsbHalf-Density and Ref2XIntB represent different refresh modes, while the voltage VPERI will be at a high logic level when the system is powered on and stable. A NAND circuit 402 receives the output of inverter 406 as well as the signal RfshBAFall and the signal EventoAT though an inverter circuit 402. Similar to fnMsbHalfDensity and Ref2XIntB, the signals RfshBAFall and EventoAT represent different refresh modes. The output of the NAND gate 410 is pro-vided as one of the inputs to the NAND gate 412. The NAND gate 412 also receives the system voltage VPERI as an input. Accordingly, when VPERI is active, when RAc-tAnyOrRef is active, and when the various refresh mode signals are in the appropriate states, the NAND gate 412 and inverter 414 provide an active signal to the CLK terminal of the latch 420.

In an example operation, the mode register is written to (e.g., via a controller performing a MRW operation) to change a state of the RFM mode register MR58 from inactive (e.g., a logical low) to active (e.g., a logical high). For the sake of this example it is assumed that the various refresh mode signals such as fnMsbHalfDensity and Ref2XIntB remain at the proper states so that the other inputs of the NAND gate 412 other than RActAnyorRef are active.

Although the signal MR58 has changed, the value of MR58out remains at a same level (e.g., a logical low) because the latch 420 has not latched the new value of MR58. When RActAnyOrRef becomes active, the signal on the clock terminal CLK becomes active, and the value of MR58 (a logical high) is latched in the latch circuit 420. This changes the output from the output terminal Q to a logical high, and the buffer circuits 426 and 428 provide the signal MR58out at a logical high. This, in turn, causes the refresh control circuit to perform one or more targeted refresh operations. A delay time after MR58out becomes high, the delay circuits 422 and 424 reset MR58out to a logical low, which is written to the mode register which causes MR58 to become low. On the next activation of RActAnyOrRef, the value in the latch 420 returns to a logical low.

In some embodiments, the RFM command MR58 may be an ARFM command, which signals that there should be a change in the depth (e.g., number of active registers) of the aggressor queue (e.g., 244 of FIG. 2). The RFM signal MR58out may be used to signal that the CAM depth should be changed. For example, the signal MR58out may be provided to the aggressor queue and the aggressor queue may change the number of active registers responsive to MR58out. The depth of the aggressor queue may be changed before the bank becomes active responsive to the activate or refresh commands.

Figure 5:
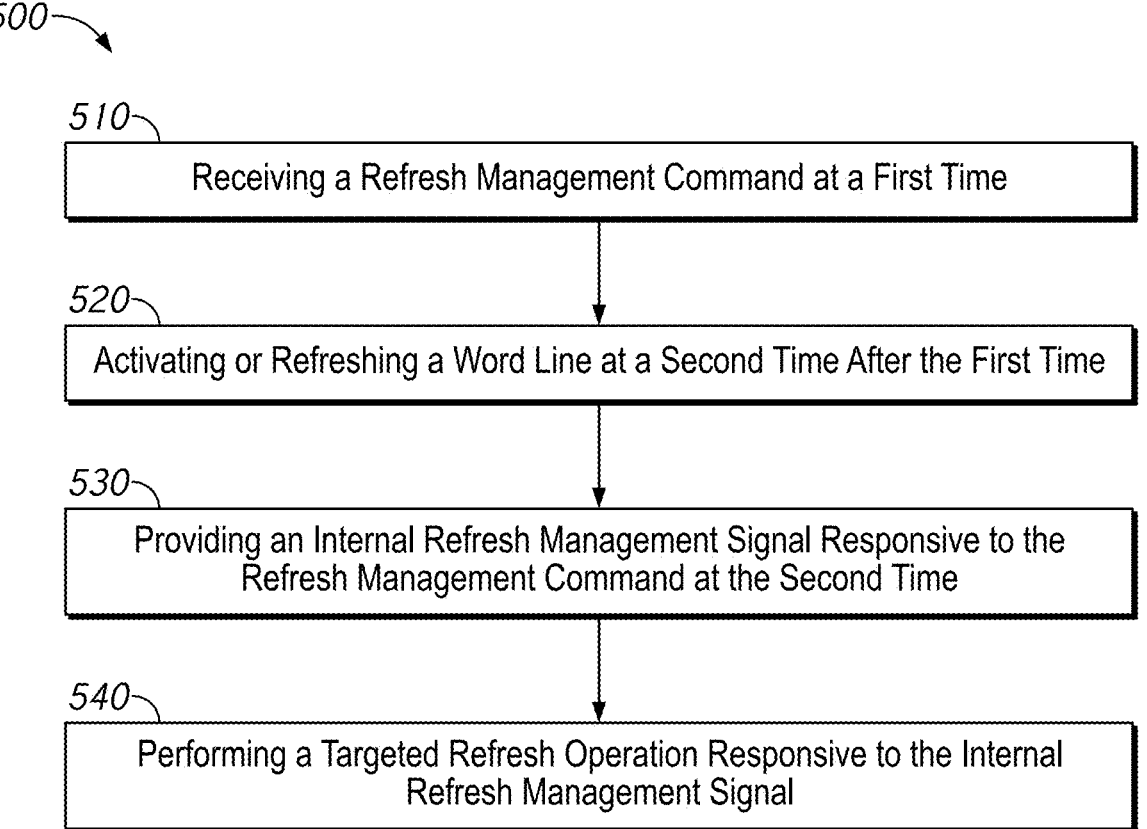
FIG. 5 is a flow chart of a method of performing RFM operations according to some embodiments of the present disclosure.

FIG. 5 is a flow chart of a method of performing RFM operations according to some embodiments of the present disclosure. The method 500 may, in some embodiments, be implemented by one or more of the apparatuses and systems described herein. For example, the method 500 may be performed by the memory device 100 of FIG. 1, the memory system 200 of FIG. 2, 300 of FIG. 3, and/or the RFM entry circuit 400 of FIG. 4.

The method 500 begins with box 510, which describes receiving a refresh management command at a first time. The refresh management command may be received from a controller, such as 240 of FIG. 2 and/or 302 of FIG. 3. In some embodiments, the method 500 may include writing to an RFM register of a mode register (e.g., 130 of FIG. 1 and/or 306 of FIG. 3) and providing the value of the mode register as the RFM command.

Box 510 may be followed by box 520, which describes activating or refreshing a word line at a second time after the first time. For example, the method 500 may include receiv-ing a refresh signal or a row activation signal from a controller. The second time may be the next time a refresh command or row activation command is received after receiving the refresh management command.

Box 520 may be followed by box 530, which describes providing an internal refresh management signal responsive to the refresh management command at the second time. For example, the method may include latching a value of the refresh management command in a latch (e.g., 420 of FIG. 4) responsive to a command signal (e.g., RActAnyorRef) which is active responsive to activating or refreshing the word line, and providing the value in the latch as the internal refresh management signal. In some embodiments, the method may include resetting the RFM command after providing the internal RFM signal. For example, the method may include resetting the RFM register at a third time (after the second time) after providing the internal RFM signal.

Box 530 may be followed by box 540, which describes performing a targeted refresh operation responsive to the internal refresh management signal. For example, the method 500 may include generating one or more targeted refresh addresses based on an aggressor address stored in an aggressor queue (e.g., 244 of FIG. 2) and word line(s) associated with the one or more targeted refresh addresses.

In some embodiments, the method 500 may include receiving an ARFM command as the RFM command and changing a depth of the aggressor queue responsive to the ARFM command. For example, the method 500 may include enabling additional slots of the aggressor queue responsive to the ARFM command.

It is to be appreciated that any one of the examples, embodiments or processes described herein may be com-bined with one or more other examples, embodiments and/or processes or be separated and/or performed amongst sepa-rate devices or device portions in accordance with the present systems, devices and methods.

Finally, the above-discussion is intended to be merely illustrative of the present system and should not be con-strued as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and draw-ings are to be regarded in an illustrative manner and are not intended to limit the scope of the appended claims.

What is claimed is:

1. An apparatus comprising:
   a refresh control circuit configured to store a plurality of identified aggressor addresses in an aggressor queue, and configured to perform a targeted refresh operation based on one of the plurality of identified aggressor addresses responsive to a refresh management signal; and a refresh management entry circuit configured to receive a refresh management command at a first time, and configured to provide the refresh management signal at a second time, wherein the second time is the next time a row activation or refresh signal is received after the first time.

2. The apparatus of claim 1, further comprising a mode register which includes a refresh management register, wherein the refresh management register in an active state is provided as the refresh management command.

3. The apparatus of claim 2, wherein the refresh management entry circuit is further configured to reset the refresh management register to an inactive level a delay time after providing the refresh management signal.

4. The apparatus of claim 1, wherein the refresh management entry circuit includes a latch configured to latch the refresh management command responsive to a command signal, wherein the command signal is active when the row activation or the refresh signal is received.

5. The apparatus of claim 1, further comprising:
a mode register configured to store one or more refresh options,
wherein the mode register is configured to receive an adaptive refresh management command which selects one of the stored refresh options and sets an operation of the refresh control circuit based on the selected one of the stored refresh options.

6. The apparatus of claim 5, wherein the refresh control circuit is configured to change a depth of the aggressor queue based on the selected one of the stored refresh options.

7. The apparatus of claim 1, wherein the refresh control circuit is configured to generate a targeted refresh address based on the one of the plurality of identified aggressor addresses.

8. A system comprising:
a controller configured to provide a refresh management command, a refresh command, or a row activation command;
a memory including:
a memory array including a plurality of word lines;
a refresh management entry circuit configured to receive the refresh management command and provide a refresh management signal on a next time the refresh command or the row activation command is received from the controller; and
a refresh control circuit configured to perform a targeted refresh operation responsive to the refresh management signal.

9. The system of claim 8, wherein the memory includes a row decoder configured to access a selected one of the plurality of word lines responsive to the row activation command.

10. The system of claim 8, wherein the refresh control circuit comprises:
an aggressor detector circuit configured to detect aggressor addresses;
an aggressor queue configured to store the detected aggressor addresses; and
a refresh address generator configured to generate a refresh address based on one of the stored aggressor addresses in the aggressor queue.

11. The system of claim 10,
wherein the memory array is configured to store a plurality of count values, each associated with one of the plurality of word lines,
wherein the aggressor detector circuit is configured to change a selected one of the plurality of count values responsive to the row activation command and a row address associated with the associated one of the plurality of word lines, and
wherein the aggressor detector circuit is further configured to detect the aggressor address based on the selected one of the plurality of count values.

12. The system of claim 8, wherein the memory further includes a mode register configured to store a refresh management register, and
wherein the controller is configured to perform a mode register write operation to change a state of the refresh management register, and wherein the state of the refresh management register is provided as the refresh management command.

13. The system of claim 12, wherein the refresh management entry circuit is configured to reset a state of the refresh management register a time after providing the refresh management signal.

14. The system of claim 8, wherein the refresh management entry circuit includes a latch configured to latch the refresh management command responsive to a command signal in an active state, wherein the command signal is in the active state responsive to the refresh command or the row activation command, and wherein a state of the latch is provided as the refresh management signal.

15. A method comprising:
receiving a refresh management command at a first time;
activating or refreshing a word line at a second time after the first time;
providing an internal refresh management signal responsive to the refresh management command at the second time, wherein the second time is a next time a refresh command or a row activation command is received after the first time; and
performing a targeted refresh operation responsive to the internal refresh management signal.

16. The method of claim 15, further comprising changing a value of a mode register and providing the value of the mode register as the refresh management command.

17. The method of claim 16, further comprising resetting the value of the mode register after providing the internal refresh management signal.

18. The method of claim 15, further comprising:
identifying an address as an aggressor address;
storing the aggressor address in a targeted refresh queue; and
generating a targeted refresh address based on the stored aggressor address as part of the targeted refresh operation.

19. The method of claim 18, further comprising:
receiving an adaptive refresh management command as the refresh management command; and
changing a depth of the targeted refresh queue responsive to the adaptive refresh management command.

20. The method of claim 15, further comprising:
latching a value of the refresh management command responsive to the activating or refreshing the word line; and
providing the latched value as the internal refresh management signal.

* * * * *